Figure 1:
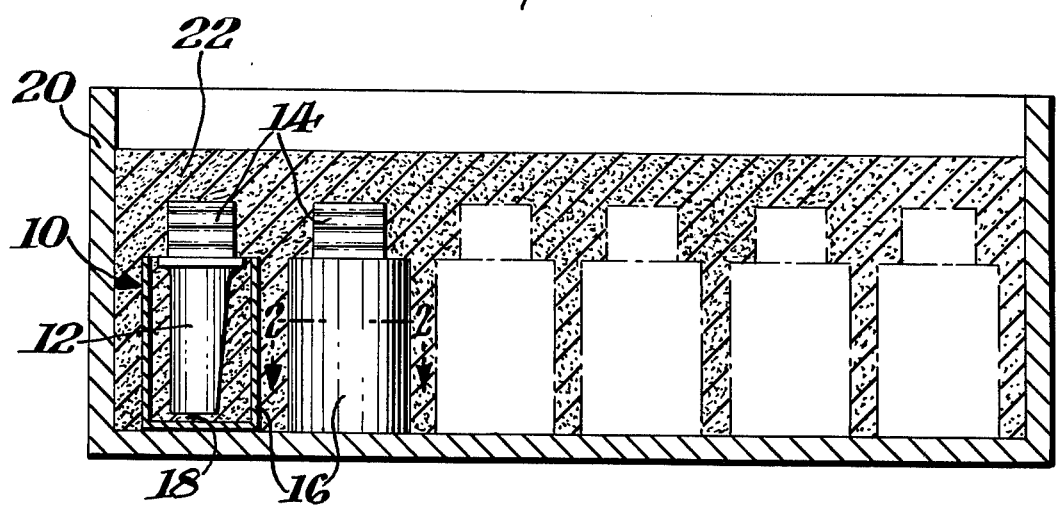

United States Patent [19]
Baldi

[11] 3,958,047
[45] May 18, 1976

[54] DIFFUSION TREATMENT OF METAL

[75] Inventor: Alfonso L. Baldi, Drexel Hill, Pa.

[73] Assignee: Alloy Surfaces Co., Inc., Wilmington, Del.

[22] Filed: May 3, 1974

[21] Appl. No.: 466,908

Related U.S. Application Data

[63] Continuation-in-part of Ser. Nos. 328,378, Jan. 31, 1973, Pat. No. 3,867,184, Ser. No. 446,473, Feb. 27, 1974, Ser. No. 404,665, Oct. 9, 1973, Ser. No. 357,616, May 3, 1973, and Ser. No. 304,220, Nov. 6, 1972, said Ser. No. 446,473, said Ser. No. 404,665, said Ser. No. 357,616, said Ser. No. 304,220, each is a continuation-in-part of Ser. No. 219,514, Jan. 20, 1972, Pat. No. 3,801,357, said Ser. No. 404,665, Ser. No. 357,616, Ser. No. 304,220, each is a continuation-in-part of Ser. No. 254,403, May 18, 1972, Pat. No. 3,785,854, and Ser. No. 90,682, Nov. 18, 1970, Pat. No. 3,764,371, said Ser. No. 254,403, is a continuation-in-part of Ser. No. 219,514, said Ser. No. 90,682, and Ser. No. 219,514, each is a continuation-in-part of Ser. No. 837,811, June 30, 1969.

[52] U.S. Cl. .............................. 427/252; 427/142; 427/282; 252/1

[51] Int. Cl.² ........................................ C23C 9/02

[58] Field of Search ................ 117/107.2 P, 38, 5.5; 252/1

[56] References Cited
UNITED STATES PATENTS

| | | | |
|---|---|---|---|
| 3,345,197 | 10/1967 | Martini et al. ............. | 117/107.2 P X |
| 3,801,353 | 4/1974 | Brill-Edwards ............ | 117/107.2 P X |

Primary Examiner—Harris A. Pitlick
Attorney, Agent, or Firm—Connolly and Hutz

[57] ABSTRACT

In the pack diffusion coating of chromium into the surface of a superalloy, the formation of undesirable oxide inclusion is reduced when the diffusion coating pack contains at least about 3% $Ni_3Al$. Also the formation of alpha-chromium is reduced when the pack diffusion is carried out in a retort effectively not over five inches in height. Pack aluminizing in the presence of chromium makes a very effective aluminum-and chromium-containing top coating over platinum plated or platinum coated nickel-base superalloys. Aluminized nickel can also have its aluminum attacked and at least partially removed with aqueous caustic to leave a very highly active catalytic surface. Pack diffusion can also be arranged to simultaneously provide different coatings in different locations by using different pack compositions in those locations. An aluminizing pack containing a large amount of chromium provides a thinner aluminized case than an aluminizing pack containing less chromium, or less chromium and some silicon. A cobalt-chromium pack deposits essentially a chromized case when energized with a chloride, but deposits large amounts of cobalt along with chromium when energized with an iodide. Even more chromium with large amounts of cobalt are deposited when the energizer is a mixture of iodide and chloride. Depletion of diffusible material from workpieces heated in a powder-pack can also be readily controlled by adjusting the pack composition, and such depletion from cobalt-base superalloys very simply provides a surface on which aluminizing produces a highly impact-resistant coating.

5 Claims, 2 Drawing Figures

U.S. Patent  May 18, 1976  3,958,047

DIFFUSION TREATMENT OF METAL

This application was filed as a continuation-in-part of application Ser. No. 328,378 filed Jan. 31, 1973 and now U.S. Pat. No. 3,867,184. By reason of the change in its inventorship, this application has become a continuation-in-part of applications Ser. No. 446,473 filed Feb. 27, 1974, Ser. No. 404,665 filed Oct. 9, 1973, Ser. No. 357,616 filed May 3, 1973, and Ser. No. 304,220 filed Nov. 6, 1972, all of which are in turn continuations-in-part of application Ser. No. 219,514 filed Jan. 20, 1972 (U.S. Pat. No. 3,801,357 granted Apr. 2, 1974). Applications Ser. Nos. 404,665, 357,616 and 304,220 are also continuations-in-part of applications Ser. No. 254,403 filed May 18, 1972 (U.S. Pat. No. 3,785,854 granted Jan. 15, 1974) and Ser. No. 90,682 filed Nov. 18, 1970 (U.S. Pat. No. 3,764,371 granted Oct. 9, 1973), of which application Ser. No. 254,403 is a continuation-in-part of application Ser. No. 219,514. Applications Ser. No. 219,514 and Ser. No. 90,682 are also continuations-in-part of application Ser. No. 837,811 filed June 30, 1969 (subsequently abandoned).

The present invention relates to the treatment of metal by diffusion coating.

Among the objects of the present invention is the provision of improved coating and treating processes and improved products thus formed. A particular object is to protect metals against corrosion or oxidation at elevated temperatures. Another object is the provision of a novel catalyst material.

Figure 2:
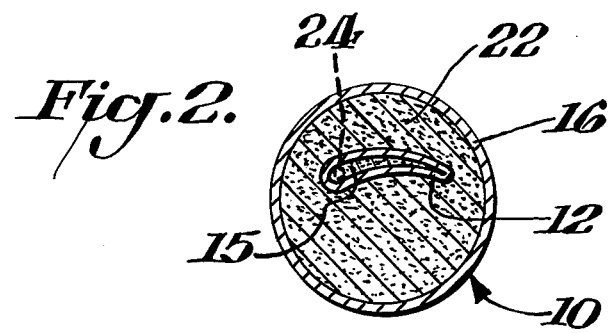

The foregoing as well as additional objects of the present invention will be more fully understood from the following description of several of its exemplifications, reference being made to the accompanying drawings wherein:

FIG. 1 is a sectional view of a packed retort for carrying out a differential coating process of the present invention, and FIG. 2 is a cross-section along line 2—2 of FIG. 1 of a workpiece packed in the retort.

It is known that superalloy articles such as turbine vanes and blades as well as burner rings in the hot section of jet engines can be diffusion coated with chromium and then diffusion coated with aluminum to improve their resistance to corrosion and oxidation at temperatures as high as 1,100°C.

One very effective technique for chromizing a superalloy workpiece in preparation for the aluminizing is as follows:

EXAMPLE 1

A group of B-1,900 jet engine blades was packed in a cupshaped retort 4 inches high in an NH$_4$Cl-energized diffusion coating pack having 14% powdered chromium and 15% powdered Ni$_3$Al. The remainder of the pack was alumina, but can be any other inert material. The energizer content was one-half % by weight of the total of the other pack ingredients. Chromizing was conducted in a hydrogen-bathed atmosphere, as in U.S. Pat. No. 3,764,371, with the retort loosely covered, holding a 1,925°F temperature for 20 hours, giving a very uniform chromized case about 0.7 mils deep, essentially free of oxide inclusions and without the formation of alpha-chromium phase.

In the event the Ni$_3$Al content of the pack is omitted or is less than about 3% by weight, a substantial amount of oxide inclusions are formed in the case, and these may cause the case to spall off under the influence of repeated thermal shock treatment, particularly if their number increases to form a continuous layer of inclusions. Such inclusions tend to form in the chromium diffusion case of any superalloy containing aluminum and/or titanium. The number of such inclusions formed diminishes sharply when the Ni$_3$Al content of the pack is at least 3% by weight, and reaches a minimum when the Ni$_3$Al content is about 6%. As much as about 20% Ni$_3$Al can be contained in the pack so that there is considerable tolerance for it and a wide concentration range for its use. It is preferred to use 8 to 15% of Ni$_3$Al so as not to require accurate measuring and also to make it unnecessary to add make-up Ni$_3$Al after each use of the chromizing pack.

In addition to reducing oxide inclusions, the Ni$_3$Al behaves like an inert diluent in the pack since it does not interfere significantly with the chromizing. Thus the chromium content of the pack can be as low as 10% and as high as 40%, regardless of the Ni$_3$Al content.

The formation of oxide inclusions during chromizing is also reduced when the chromizing takes place in an evacuated atmosphere as described for example in U.S. Pat. No. 3,290,126 granted Dec. 6, 1966. In an evacuated atmosphere the chromium content of the pack should be relatively high, e.g. from about 25 to about 60% by weight to keep the chromizing time from exceeding 30 hours, and the energizer should be a nonvolatile halide.

The foregoing reduction in oxide inclusion and alpha-chromium phase formation is also obtained when other nickel-base super alloys are substituted for the B-1,900 alloy of Example 1. Such alternative superalloys include any alloy having 50 to 75% nickel and a little aluminum or titanium. Also the Ni$_3$Al can be replaced by intermetallics ranging from Ni$_{3.5}$Al to Ni$_2$Al with equivalent results.

When chromizing the foregoing superalloys at atmospheric pressure or at somewhat above atmospheric pressure there is a tendency to form alpha phase chromium on the chromized superalloy workpiece even when the chromium pick-up is as low as 1 to 3 milligrams per square centimeter of surface. Such alpha phase formation is helpful in that after a subsequent aluminizing coated members have greater resistance to corrosion, but the alpha chromium tends to be brittle and does not provide a good surface for receiving vapor-deposited top coatings such as that described in U.S. Pat. No. 3,676,085. By using a cup-shaped retort effectively not over 5 inches in height, it has been discovered that the formation of alpha chromium phase is prevented. Retort cups taller than 5 inches can be effectively used without alpha chromium formation by perforating the side wall of the retort at a level within 5 inches of its bottom. The perforations can be one-eighth inch diameter holes drilled through the retort wall to provide venting about 1 to 2 square inches in cross-sectional area for every pound of diffusion coating pack. Small holes such as those one-eighth inch in diameter generally do not permit any significant amount of the pack to spill out through them, but larger size holes can be used and covered by a wire screen when the retort is being loaded.

It is preferred to maintain an effective retort height of at least two inches, as by providing the foregoing venting at least two inches up from the bottom of the retort. It should also be noted that such venting is not to the air but to the space that surrounds the inner retort. That space is bathed by a stream of hydrogen, but can instead be bathed by a stream of inert gas like argon, during the chromizing. In general this reduction in alpha phase formation is obtained with any chromium-diffusion pack but it does not require the presence of any of the foregoing nickel aluminide intermetallics in the pack. However the presence of 3% or more of such intermetallic in the pack will even further reduce the tendency to form alpha chromium. Modifying Example 1 by replacing its retort with an unperforated retort cup 10 inches high will provide a chromized case about 1.5 mils thick with a substantial content of alpha phase chromium and suitable for subsequent aluminizing to make an excellent product that without further treatment has unusually good sulfidation resistance.

The diffusion aluminizing that follows the diffusion chromizing can be either an inhibited or an uninhibited aluminizing. The uninhibited aluminizing is conducted with no more than a slight amount of chromium, or none at all, present in the aluminizing pack. A chromium content about half that of the aluminum, by weight, inhibits the aluminizing by greatly reducing the aluminum coating rate and is described for instance in U.S. Pat. No. 3,257,230. As pointed out in that patent, larger proportions of chromium to aluminum can also be used in the inhibited aluminizing, and proportions greater than 3:1 by weight cause some of the chromium to diffuse into the aluminized case along with the aluminum.

Chromium-inhibited aluminizing is however particularly desirable as a top coating over a platinum diffusion or electroplated coating on nickel-base superalloys, and in such a combination provides greater sulfidation resistance at high temperatures than the use of the uninhibited aluminizing in such a combination as described in U.S. Pat. No. 3,677,789 granted July 18, 1972. The same advantage is obtained when other platinum metals, particularly palladium, are used in place of platinum. Suitable examples of chromium-inhibited aluminizing are described in Canadian Patent 806,618 issued Feb. 18, 1969, as well as in U.S. Pat. No. 3,257,230. The nickel-base superalloys are also described in those patents and generally are those high temperature alloys which contain at least about 50% nickel and about 6 to 25% chromium.

The following coating illustrates this coating combination.

EXAMPLE 2

A jet engine (hot section) blade of B-1,900 alloy and electroplated with a 0.0003 inch thick layer of platinum was subjected to a hydrogen-bathed pack diffusion coating at 1,890°F for 12 hours, in a previously used pack consisting of, by weight:
magnesothermic chromium powder 45%
alumina (−325 mesh) 45%
aluminum powder (−325 mesh) 10% activated with one-half % NH$_4$Cl.

The thus treated blade had a 0.003 inch thick diffusion case and shows exceptional sulfidation resistance.

Other types of very finely divided chromium less than 10 microns in size can be used in place of the magnesothermic powder in the foregoing example.

An aluminum diffusion coating can also be used to prepare catalytic nickel. Thus a foil 5 mils thick of pure nickel can be aluminized in an ammonium chloride-energized pack consisting of 20% aluminum and 80% alumina, using a coating temperature of 1,100°F for 10 hours. The coated surface contains at least about 30% aluminum, and when subjected to treatment with 10% aqueous caustic soda at 20° to 40°C loses most of its aluminum to the caustic soda, leaving a highly active nickel surface that effectively catalyzes hydrogenation. The caustic stops reacting when the aluminum content of the surface is sufficiently depleted, and the thus treated surface should, until ready for use, be kept under water or other protective fluid to keep it from heating up as a result of contact with the air. The resulting foil in an effective catalyst for hydrogenating soybean oil for example, using the continuous flow technique as described on pages 522 and 523 of "Unit Processes in Organic Synthesis," P. H. Groggins, editor-in-chief, fourth edition, published 1952 by McGraw-Hill Book Company. A catalyst contact time of about 15 seconds at a temperature of 130° C and a hydrogen pressure of 100 atmospheres effects substantial hydrogenation.

Nickel wool, or nickel-plated iron wool or foil, can be aluminized instead of nickel foil to provide the catalytic nickel surface. The dissolving of the aluminum from the surface can be effected with any caustic including caustic potash and should be carried out at a temperature below the boiling point of the caustic solution used. The aluminized nickel can be stored as such for many months, until just before catalytic use, the aluminum being then dissolved to provide freshly formed catalyst.

Diffusion coatings can also be applied so that some portions of a workpiece contain a thinner coating than other portions. Thus roots or hollow interiors of turbine blades can be arranged to be diffusion coated at the same time the remainder of the blade is diffusion coated, but with less coating than the remainder of the blade. The following example is typical:

EXAMPLE 3

A set of hollow first stage turbine blades of B-1,900 alloy had their hollow interiors filled with the following aluminizing pack:

Inside Pack

45% chromium
10% aluminum
Balance alumina plus one-half % NH$_4$Cl

The blades so filled were packed in an aluminizing pack containing:

Outer Pack

20% chromium
11% aluminum
1.4% silicon
Balance alumina plus one-half % NH$_4$Cl

All ingredients were −200 mesh. A retort so packed was then subjected to a hydrogen-bathed coating heat at 1,800°F for 5 hours, and after clean-up the blades showed a 4.3 milligram per square centimeter pick-up of aluminum on their interior surfaces, with a 10.2 milligram per square centimeter aluminum pick-up on their exterior surfaces. Similar results are obtained whether or not the foregoing packs are given a break-in pre-firing.

In the same way the roots of blades or buttresses of vanes or trailing edges of both blades and vanes can be given coatings thinner than the remainder of the blades or vanes. Reducing the chromium content of the internal pack to 20% increases the internal coating weight. An increase in outer coating is obtained by reducing the chromium content of the outer pack or increasing its aluminum or silicon content.

Conversely, increasing the chromium content of the inner pack to 60% further diminishes the internal coating weight.

Without the chromium in the outer pack, the silicon in that pack only slightly diminishes the magnitude of the aluminum it deposits, and without the silicon the changes in chromium content of the outer pack have much less effect. The combination of the chromium, silicon and aluminum provides the coating control when the aluminum content of the pack is as little as 3% and as much as 20%, with the chromium content greater than, preferably about 1.5 to 3 times, that of the aluminum, and the silicon content about 10 to 20% that of the aluminum. The coating temperatures can vary from about 1,600°, preferably 1,700°, to about 2,200°F, and the workpieces can be any metal that is not melted at the coating temperature, such as any nickel- or cobalt-based superalloy, DS nickel, DS nichrome, chromium-containing iron, and type 300 and 400 stainless steels.

Omitting the chromium or the silicon or both the chromium and the silicon, from the outer pack greatly increases the rate at which the aluminum deposits on the surface of the workpiece.

Nickel can also be used in the diffusion coating pack in place of chromium and/or silicon to inhibit the rate at which an aluminum diffusion coating forms.

The B 1,900 alloy turbine blades are preferably heat treated at 1,975°F for four hours followed by rapid cooling at least as fast as air cooling to below 200°F, with a subsequent aging at 1,650°F for ten hours and a final rapid cooling, in order to develop their best mechanical properties. These heat treating steps can be carried out during the diffusion treatment to differentially coat, by using the snugly fitting containers and procedure described in application Ser. No. 159,175, filed July 2, 1971 and issued as U.S. Pat. No. 3,824,122 granted July 16, 1974.

Another technique for simultaneously applying two different diffusion coatings is to use different energizers. This is illustrated by the following example:

EXAMPLE 4

The same B-1,900 blades of Example 3 had their interiors filled with the following diffusion coating pack:

Inside Pack 18.5% $Ni_3Al$
18.5% Alumina
47% Co
15.5% Cr
0.5% $NH_4Cl$

The thus filled blades were packed in the following pack:

Outer Pack 18.5% $Ni_3Al$
18% Alumina
46.5% Co
15% Cr
2% $NH_4I$

Using a 2,000°F coating temperature for ten hours in a hydrogen-bathed atmosphere produced an internal coating which was essentially a chromized case containing a negligible amount of cobalt. On the other hand the outer coating was a case that contained more cobalt than chromium and, after an aluminum top coat, provided a somewhat greater resistance to high temperature oxidation. The two cases had approximately the same thickness. It will be noted that the $Ni_3Al$ in these formulations acted as an inert diluent and can be replaced by other nickel aluminides as pointed out above, or by alumina where the formation of oxide inclusion is not objectionable or when the chromizing is effected under subatmospheric pressure.

Mixing the two energizers ($NH_4Cl$ and $NH_4I$ or their equivalents) enables the application of diffusion coatings of intermediate composition. Thus a mixture of 0.5% $NH_4Cl$ and 0.5% $I_2$, both by weight, provides a coating containing almost as much cobalt as chromium. $NH_4Br$ can be used as energizer in place of chloride, the bromide acting very much like the chloride. Other volatilizable compounds of chlorine, bromine and iodine can be used as energizers with similar results so long as there is sufficient chromium and cobalt in the pack to provide the coatings. At least about 10% of each of these metals by weight or of all the metal content of the pack is all that is needed, and it is preferred to have at least about 15% inert filler by weight; without filler the pack tends to sinter together at temperatures of 2,000°F or higher.

The wall of the blades of Example 4 does a good job of keeping the diffusion coating atmosphere on the outside of each blade from affecting the diffusion coating atmospheres in the interiors of the blades. Where the different coatings of Example 4 are to be applied to adjacent portions of the outer surfaces, these portions can be effectively separated by a metal wall separating one pack from the other.

Where the pack on one side of such a separating wall has a tendency to vent its activator vapors into the pack on the other side of the wall, as can happen with the foregoing hollow blades when the opening into their hollow interiors is so located that it is submerged in the external pack, it is preferred to have more activator present in the external pack than in the internal pack, and to have a very small amount of activator in the internal pack, for example one-fourth to one-half percent by weight of the pack. Even such a small amount produces substantial excess vapor on heat-up and such vapor is vented out the opening for the hollow interiors. The effect of such vapors in contaminating the activator vapors generated in the external pack is reduced by keeping the activator content low in the internal pack, and swamping any vapors vented into the external pack by a larger activator content in the external pack as well as by the use of much more external pack than internal pack.

As in the case of simple diffusion coating packs, the inside and outer packs of Example 4 can be reused. It is desirable for such reuse to replenish the packs for so much of their contents as have been consumed in a coating operation. This keeps the pack fairly uniform in composition so it is not necessary to make many adjustments for such reuse or even for repeated reuse. Inasmuch as the activator is fairly thoroughly driven off during any diffusion coating operation, an inside pack can be used as an outer pack or vice versa, the amount and nature of the activator being selected to match the nature of the reuse rather than the past history of the pack. If it is no trouble to adjust the coating conditions for reuse without replenishment, this can also be done.

The pack of Example 1 can also be similarly reused with or without replenishment.

The foregoing chromium and cobalt-chromium coatings are particularly suited for application at temperatures of at least 1,700°F to protect nickel-base superalloys against high temperature oxidation and sulfidation, in which event it is preferred to apply over these coatings a diffusion coating of aluminum or a coating of aluminum-chromium mixtures such as those described in U.S. Pat. Nos. 3,528,861 and 3,676,085. For these purposes the differential coatings are preferably applied with the use of a retort effectively not over five inches high.

The following additional examples show modified forms of differential diffusion coating:

EXAMPLE 5

Jet engine hot section blades composed of PWA-1422 and with hollow interiors, were coated so the outer air foil surface had a heavy aluminized case and the root a thin aluminized case, with the interiors uncoated. This alloy has the following composition:

| | |
|---|---|
| Chromium | 9% |
| Cobalt | 10% |
| Titanium | 2% |
| Colombium | 1% |
| Aluminum | 5% |
| Tungsten | 12.5% |
| Carbon | 0.15% |
| Boron | 0.015% |
| Zirconium | .05% |
| Hafnium | about 1% |
| Nickel | Balance |

To make sure the blades were clean their external and internal surfaces were first solvent cleaned in trichloroethylene, then dry blasted with 220 grit aluminum oxide propelled by air at a pressure of 30 psig. Any residual abrasive was then blown off the blades. The interiors of the blades were then filled with the masking composition made up of equal parts by weight of $Ni_3Al$ and alumina to which mixture is added metallic chromium so that its concentration is 1.6% by weight, all ingredients being minus 240 mesh. The blades were then packed in individual retort arrangements.

The outer air foil section of each blade was packed in a closely fitting pre-aluminized plain carbon steel tube with the following heavy coating pack composition (all percentages by weight):

20% chromium powder the particles of which range in size from about 1 to about 10 microns
11% −250 mesh aluminum-silicon alloy containing approximately 88% aluminum and 12% silicon
68.5% 325 mesh aluminum oxide
0.5% ammonium chloride The packing was as illustrated in the figures where each blade is shown at 10, its air foil section at 12, its root at 14, the masking pack at 15, the opening through which the masking pack is inserted at 24, the pre-aluminized steel tube at 16, and the heavy coating pack at 18. It was then placed in a large retort 20 and a number of additional blades similarly prepared were placed alongside it in that retort. Over this assembly in the retort there was poured the following light coating pack 22 (all percentages by weight):

45% of the same chromium powder used in the heavy coating pack
15% 325 mesh aluminum powder
39.5% 325 mesh aluminum oxide
0.5% ammonium chloride Before the packing each of the packs was broken in by heating to 1,600°F or higher for 5 hours, after which the ammonium chloride content of the packs was returned to its original value by supplemental additions.

A number of retorts 20 were then piled up within an outer retort as described in U.S. Pat. No. 3,764,371, and heated by a surrounding furnace under a hydrogen atmosphere to 1,650°F plus or minus 25°F, which temperature was held for four hours. The assembly was then cooled under hydrogen, the hydrogen subsequently flushed out and the retorts opened and unloaded. The individual blades still with their air foil sections packed in tube 16, were then removed from the outer pack, a process which is easily accomplished inasmuch as the relatively low treatment temperature does not cause the pack particles to adhere together very tightly. The individual blades were then withdrawn from the individual tubes, and the masking mixtures in the hollows of the blades were finally poured out through the same air-cooling openings 24 used for introducing that mixture. With the help of a blast of air all residual packing and masking powder was blown off and the blades thus cleaned next placed in a furnace where they were heated under dry hydrogen to 1,975°F at which temperature they were held for four hours, following which they were rapidly cooled down with the help of a hydrogen flush to about 300°F over a one hour period. They were then heated in air, argon or hydrogen or other inert atmosphere at 1,650°F for ten hours to complete their preparation for use. The average case depth for the outer air-foil surface was 3.6 mils and the average case depth for the roots was 1.8 mils.

Essentially the same results are obtained when the workpieces are completely packed in individual snugly fitting retort tubes as described in application Ser. No. 159,175 and subjected to the heat treatment sequence while still in those tubes and during the coating step, as also described in that application.

When coating with a diffusion coating pack in which the metal content is aluminum, or a mixture of aluminum and silicon, a prior break-in heat with such pack is not needed.

Using the manipulative technique of Example 5 or the alternative technique described in U.S. Pat. application Ser. No. 159,175, the process of Example 5 can be modified so the interior surface of the blade is also coated, by substituting for the masking pack the light coating pack used around the root. Three different coatings can be simultaneously applied by using the chromizing packs of Example 4 against the root and outer air foil surface of a hollow blade, while aluminizing its interior surface. Thus the inside pack of Example 4 can be applied to the root, the same pack but with its $NH_4Cl$ replaced by an equal quantity of $NH_4I$ used against the outer air foil surface, and the lighter aluminizing pack of Example 5 packed in the hollow interior of the blade. The blade thus coated is particularly suited to receive on its outer air foil surface and on its root surface the top coatings of U.S. Pat. Nos. 3,528,861 or 3,676,085.

Alternatively the root surface is masked and the interior surface of the air foil given the light aluminum coating while the external surface of the air foil the heavy coating. A still further alternative is to subject the external surface of the air foil to the coating treatment described in U.S. Pat. Nos. 3,528,861 or 3,676,085 while the internal surface of the air foil is masked and the root subjected to the light coating of Example 5. If desired the coating of U.S. Pat. Nos. 3,528,861 or 3,676,085 can be applied in this combination after the diffusion aluminizing of the root, and directly to the external surfaces of the air foil, or after those external surfaces have been given a heavy or light aluminizing.

The following is an additional example of differential coating:

EXAMPLE 6

A row of jet engine vanes made of cobalt-base superalloy X-40 is packed in an Incolloy 800 retort with their external airfoil surface embedded in the following powder pack mixture (by weight):

| | |
|---|---|
| Aluminum | 10% |
| Chromium (very fine particles) | 28% |
| Alumina | 61.5% |
| NH$_4$Cl | 0.5% |

The pack mixture had been prefired, a treatment that drove off essentially all the original NH$_4$Cl, and an additional quantity of fresh NH$_4$Cl mixed with the prefired material after it had cooled down.

The packing was effected by aligning the vanes so the buttresses at each vane end were on the left and right of the row of vanes. The powder pack beyond the buttresses was then sucked away by a vacuum cleaner with a small nozzle, leaving the far surfaces of the buttresses uncovered.

Against these uncovered surfaces is then poured and tamped down the following powder pack mixture (by weight):

| | |
|---|---|
| Aluminum | 10% |
| Chromium (very fine particles) | 45% |
| Alumina | 44.5% |
| NH$_4$Cl | 0.5% |

This pack mixture had also been prefired and had had its NH$_4$Cl replenished. The final assembly is then subjected to diffusion coating conditions in a glass-sealed retort assembly at 2,050°F for twenty hours. After cooling to 200°F the glass seal is broken and the retort emptied. The vanes are cleaned with a light blasting by very fine glass microspheres blown by a stream of air from a 10 psig supply, and are beige-colored, showing that they are coated all over. However the coating on the end faces of the butresses measures about 2.5 mils in case depth, whereas the airfoil surface coating measures about 3.5 mils in case depth.

Limiting the diffusion coating treatment so that the heating of the packed retort is at 1,950°F for sixteen hours produces an outer buttress coating case of about 1.5 mils and an airfoil coating case of about 2.5 mils.

When pack diffusion coating the interior of a hollow vane or blade whose exterior has been coated, or when pack diffusion coating a relatively small portion of a workpiece surface, as for instance to touch up a defective spot having an area up to about 10% of a prior coating in the manner shown in FIGS. 2 and 3 of U.S. Pat. No. 3,801,357 granted Apr. 2, 1974, it is not necessary to apply to the remaining surfaces a pack that masks by some kind of gettering action such as the action of Ni$_3$Al on aluminum. However to keep the remaining surfaces from excessive deterioration they can be packed in an essentially inert pack containing a depletion-reducing amount of the critically diffusible metal ingredients in those surfaces. To this end an aluminized superalloy surface being touched up in one area by further aluminizing, can have its remainder packed in a pack of powdered alumina or other inert material, containing by weight about one-fourth percent finely divided aluminum metal and about 1% finely divided chromium metal, or an equivalent amount of an aluminum-chromium alloy. The aluminum content of the pack can range from about one-eighth % to about 2% by weight, and the chromium content can also have the same range. The use of aluminum without chromium in the inert pack, is also helpful but is not as desirable.

Similarly, coating the interior of a blade whose exterior has already been given the cobalt-chromium-aluminum-yttrium coating of U.S. Pat. No. 3,676,085 applied over an aluminized or chromized case, is preferably carried out with the previously coated exterior of the workpiece surface embedded in a pack of powdered alumina or other inert material, containing about 1½ cobalt, about one-half % chromium, and about one-fourth % aluminum, all calculated by weight. Preferred concentration ranges for these three metals in such pack are:

| | |
|---|---|
| Cobalt | ½ to 10% |
| Chromium | ¼ to 3.5% |
| Aluminum | ⅛ to 2% |

Although the cobalt-chromium-aluminum-yttrium coating being protected also contains a small but critical amount of yttrium, that yttrium does not appear to be a critically diffusible metal whose depletion needs a safeguard such as the presence of a little yttrium metal in the inert pack. The cobalt, chromium and aluminum particles present in the inert pack can be either of the individual metals, or alloys of any two or all three of these metals. In general aluminum, chromium, nickel and cobalt are the critical diffusible metals found in protective coatings on superalloys The masking pack of Example 5 is also such a depletion-preventing pack.

The foregoing inert packs containing depletion-reducing ingredients can be reused. When reused, their metal ingredients will generally be inter-alloyed as a result of the prior use.

In some cases depletion of diffusible material from a workpiece surface is beneficial. As noted in U.S. Pat. No. 3,647,517 granted Mar. 7, 1972, aluminide coatings diffused onto the surface of cobalt-base superalloy workpieces are generally quite brittle, so that the protection provided by those aluminide coatings leaves something to be desired. However pretreating the workpieces so as to effect substantial diffusion depletion from those surfaces then causes an aluminide coating subsequently applied to be much less brittle.

The following is a typical example:

EXAMPLE 7

A group of Mar-M-509 jet engine turbine vanes was packed in a plain carbon steel retort in a powder pack of equal parts by weight 325 mesh alumina and finely divided nickel the particles of which are about 40 microns in size. The pack is activated with about one-half % by weight ammonium chloride and the retort so packed is heated in hydrogen to a temperature of 2,000°F for 20 hours. The hydrogen atmosphere was provided as shown in U.S. Pat. No. 3,764,371.

At the completion of the heating the retort was permitted to cool and the cooled vanes removed from the pack. These vanes showed a weight loss of about 35 milligrams per square centimeter over their entire surface, and a typical cross section of a vane showed on microscopic examination a significant number of voids adjacent the surface that was in contact with the pack.

The resulting vanes were then given a chromium-inhibited aluminum diffusion coating from a diffusion coating pack in accordance with Example 2, but with the maximum heating temperature at 2,050°F maintained for 20 hours. The final vanes had an aluminized case approximately 6 mils deep which exhibited unusually high resistance to impact damage. The same aluminizing carried out on a non-depleted Mar-M-509 vane provides an aluminized case only about 3 mils thick and very brittle.

The Mar-M-509 alloy is a well known cobalt-base superalloy and its composition is given in U.S. Pat. No. 3,647,517. Other cobalt-base alloys such as the additional five listed in Table 1 of the last-mentioned patent also lend themselves to this improved procedure for coating with an impact-resistance protective aluminide case. In each instance the depletion should provide a weight loss from about 3 to about 75 milligrams per square centimeter of surface. No scale is formed on the workpiece surface as a result of the depleting step, and the scale removal operation referred to in U.S. Pat. No. 3,647,517 is not needed.

Instead of nickel alone as the metallic ingredient of the depleting pack, alloys of nickel with aluminum for example can be used, although a proportion of aluminum larger than that in $Ni_3Al$ is not desired. The nickel or nickel alloy can also be replaced by cobalt, and any of these metals can be present in the depleting pack in a proportion of from about 10 to about 90% by weight, the remainder of the pack being either alumina or any other inert diluent such as magnesia, to keep the metal particles from sintering together. It is preferred that the metal particles be no greater than about 200 microns in size.

The retort can be of steel, stainless steel or nickel-base alloys, and its composition does not seem to affect the process so long as it does not contain low melting metals such as zinc.

The pack activator can be any halide diffusion activator including ammonium iodide, ammonium bromide, ammonium bifluoride, elemental iodide or bromine, etc., and its content can be as low as one-eighth of 1% of the pack by weight. The depleting temperature to which the cobalt-base superalloy or pieces are subjected in contact with the pack can be as low as 1,600°F or as high as 2,200°F, and the depleting times can be as little as 2 hours to as much as 100 hours, the longer times being used with the lower temperatures and vice versa.

Instead of hydrogen atmosphere during the depletion, the atmosphere can be of inert gas such as argon. The activator provides a halide vapor upon heat-up and such vapor accelerates the depletion in much the same manner as it accelerates the diffusion coating of workpieces.

The more impact-resistant aluminized cobalt-base superalloy vanes and the like made in the foregoing manner are particularly desirable for use in jet engines such as those in aircraft where these articles are subject to impact damage, and make long lived first stage hot section vanes.

Nickel base superalloys also show the foregoing depletion when subjected to the foregoing diffusion depletion action, but protective diffusion aluminized cases on nickel base superalloys are not nearly as brittle as those on cobalt base superalloys, so that the aluminizing of the depleted nickel base superalloys provides a case with only a little more impact resistance as compared with the aluminizing of untreated nickel base superalloys.

Obviously many modifications and variations of the present invention are possible in the light of the above teachings. It is therefore to be understood that within the scope of the appended claims the invention may be practiced otherwise than as specifically described.

What is claimed:

1. In the pack diffusion coating of a small portion of the surface of a protectively cased superalloy while the balance of the surface is packed against an essentially inert pack and the case contains added diffusible metal from the class consisting of aluminum, chromium, nickel, cobalt and mixtures thereof, the improvement according to which the essentially inert pack contains depletion-inhibiting amounts of said added diffusible metals.

2. The combination of claim 1 in which the inert pack contains depletion-inhibiting amounts of aluminum and chromium.

3. The combination of claim 1 in which the inert pack contains depletion-inhibiting amounts of cobalt, aluminum and chromium.

4. A powder pack for use in masking a superalloy workpiece, an unmasked portion of which is to be given a local coating by pack diffusion, the masking pack consisting essentially of an inert diluent powder and by weight from about ⅛ to about 2% powdered aluminum as well as from about ⅛ to about 2% powdered chromium.

5. The combination of claim 4 in which the diluent powder is alumina.

* * * * *